(12) United States Patent
Magg et al.

(10) Patent No.: US 11,471,977 B2
(45) Date of Patent: Oct. 18, 2022

(54) MONITORING A THERMAL CUTTING PROCESS

(71) Applicant: TRUMPF Werkzeugmaschinen GmbH + Co. KG, Ditzingen (DE)

(72) Inventors: Winfried Magg, Ditzingen (DE); David Schindhelm, Stuttgart (DE); Boris Regaard, Stuttgart (DE); Oliver Bocksrocker, Stuttgart (DE); Volker Rominger, Steinheim an der Murr (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 443 days.

(21) Appl. No.: 16/382,300

(22) Filed: Apr. 12, 2019

(65) Prior Publication Data
US 2019/0240785 A1 Aug. 8, 2019

Related U.S. Application Data

(63) Continuation of application No. PCT/EP2017/075768, filed on Oct. 10, 2017.

(30) Foreign Application Priority Data

Oct. 13, 2016 (DE) .......................... 102016219927.7

(51) Int. Cl.
*B23K 26/38* (2014.01)
*B23K 26/03* (2006.01)
(Continued)

(52) U.S. Cl.
CPC .............. *B23K 26/38* (2013.01); *B23K 10/00* (2013.01); *B23K 26/032* (2013.01);
(Continued)

(58) Field of Classification Search
CPC ...... B23K 26/38; B23K 10/00; B23K 26/032; B23K 26/0604; B23K 26/0626; B23K 26/0643; B23K 26/0648
(Continued)

(56) References Cited

U.S. PATENT DOCUMENTS 6,798,511 B1 * 9/2004 Zhan .......................... G01J 4/00
 356/369
9,457,427 B2 10/2016 Hesse et al.
(Continued)

FOREIGN PATENT DOCUMENTS

CN 105993033 10/2016
DE 102 55 628 7/2004
(Continued)

OTHER PUBLICATIONS

Amara et al., "Numerical investigations on high-power laser cutting of metals," Appl. Phys. A, 2015, 119: 1245-1260.
(Continued)

*Primary Examiner* — John J Norton
*Assistant Examiner* — Simpson A Chen
(74) *Attorney, Agent, or Firm* — Fish & Richardson P.C.

(57) ABSTRACT

A device for monitoring, in particular for closed-loop control, of a thermal cutting process carried out on a workpiece. The device includes a focusing unit for focusing a machining beam, in particular a laser beam, onto the workpiece for the formation of a kerf on the workpiece. The device also includes an image acquisition unit to generate at least one image of a region of the workpiece, and an evaluation unit configured to determine, based on the at least one image, at least one measured variable for the course of the gap width of the kerf in a thickness direction of the workpiece. The invention also relates to an associated method for monitor-
(Continued)

ing, in particular for closed-loop control, of a thermal cutting process carried out on a workpiece.

21 Claims, 2 Drawing Sheets

(51) Int. Cl.
 *B23K 26/06* (2014.01)
 *B23K 10/00* (2006.01)
(52) U.S. Cl.
 CPC ...... *B23K 26/0604* (2013.01); *B23K 26/0626* (2013.01); *B23K 26/0643* (2013.01); *B23K 26/0648* (2013.01)
(58) Field of Classification Search
 USPC .................................................. 219/121.67
 See application file for complete search history.

(56) References Cited

U.S. PATENT DOCUMENTS

| 10,058,953 | B2* | 8/2018 | Hesse | B23K 31/125 |
|---|---|---|---|---|
| 2003/0095267 | A1* | 5/2003 | Mieher | G06K 7/0095 |
| | | | | 356/614 |
| 2005/0035094 | A1 | 2/2005 | Titze et al. | |
| 2006/0138111 | A1 | 6/2006 | Hillebrand et al. | |
| 2013/0146569 | A1* | 6/2013 | Woods | B23K 26/20 |
| | | | | 219/121.72 |
| 2016/0114434 | A1 | 4/2016 | Regaard | |
| 2016/0193692 | A1* | 7/2016 | Regaard | B23K 26/0626 |
| | | | | 219/121.62 |
| 2018/0147671 | A1* | 5/2018 | Bader | B23K 26/38 |

FOREIGN PATENT DOCUMENTS

| DE | 10 2012 100 721 | 4/2013 | |
|---|---|---|---|
| DE | 10 2014 000 330 | 3/2015 | |
| DE | 102014000330 B3 * | 3/2015 | ........... B23K 26/032 |
| DE | 10 2013 209 526 | 4/2015 | |
| DE | 10 2013 210 078 | 4/2015 | |
| DE | 10 2013 218 421 | 4/2015 | |
| DE | 10 2014 203 645 | 9/2015 | |
| JP | 04138887 A * | 5/1992 | |
| JP | H04138887 | 5/1992 | |
| JP | 2003-181662 | 7/2003 | |
| JP | 2003220479 | 8/2003 | |
| WO | WO 2012/037955 | 3/2012 | |
| WO | WO 2012/107331 | 8/2012 | |
| WO | WO 2014/191061 | 12/2014 | |
| WO | WO 2015/036140 | 3/2015 | |
| WO | WO 2015/106775 | 7/2015 | |
| WO | WO 2015/117979 | 8/2015 | |

OTHER PUBLICATIONS

International Preliminary Report on Patentability in International Application No. PCT/EP2017/075768, dated Apr. 16, 2019, 8 pages (English translation).
International Search Report and Written Opinion in International Application No. PCT/EP2017/075768, dated Jan. 30, 2018, 27 pages (with English translation).
CN Office Action in Chinese Appln. No. 201780063283.6., dated Oct. 14, 2020, 13 pages (with English abstract).
CN Office Action in Chinese Appln. No. 201780063283.6, dated Sep. 10, 2021, 27 pages (with English translation).

* cited by examiner

MONITORING A THERMAL CUTTING PROCESS

CROSS REFERENCE TO RELATED APPLICATIONS

This application is a continuation of and claims priority under 35 U.S.C. § 120 from PCT Application No. PCT/EP2017/075768, filed on Oct. 10, 2017, which claims priority from German Application No. 10 2016 219 927.7, filed on Oct. 13, 2016. The entire contents of each of these priority applications are incorporated herein by reference.

TECHNICAL FIELD

The present invention relates to a device and method for monitoring, in particular for closed-loop control, of a thermal cutting process carried out on a plate-like workpiece, in particular on a metal sheet.

BACKGROUND

In WO 2015/036140 A1, a device for monitoring, in particular for closed-loop control, of a cutting process is described, which comprises an image acquisition unit for the acquisition of a region to be monitored on the workpiece, wherein the region to be monitored comprises a region of interaction between a laser beam and the workpiece, as well as an evaluation unit which is designed to determine at least one characteristic variable of a kerf formed during the cutting process, for example, a cutting front angle.

The image acquisition unit described in WO 2015/036140 A1 is designed for the formation of an observation beam for the observation of the interaction region from an observation direction extending at an angle relative to the beam axis of the laser beam and comprises an imaging optic system for the generation of an image of the interaction region from the observation direction extending at an angle relative to the beam axis of the laser beam. If the observation direction does not extend in a feed direction of the cutting process or if it extends opposite said direction, the evaluation device can detect, based on the recorded image, burr formation, roughness and/or score marks, as characteristic variable(s) of the kerf.

In WO 2012/107331 A1, a device for monitoring and in particular for closed-loop control of a laser cutting process is described, which can be designed to detect, based on an image of a region of interaction between a laser beam and a workpiece, the presence or absence of burr formation on a kerf. For example, in a fusion cutting process, with the appearance of three light stripes starting from the cutting front, it can be concluded that there is burr formation (crumbly burr).

In DE 10 2014 000 330 B3, a method and a device for monitoring and optionally closed-loop control of the focus position of a laser machining beam during the laser cutting of a workpiece are described, wherein, with at least one imaging camera, an optical process emission caused by the laser machining and a cutting front advancing in the workpiece are acquired with spatial resolution in one or more images. The instantaneous focus position of the machining laser beam relative to the surface of the workpiece is then in each case detected from an instantaneous expansion of the process emission and an instantaneous distance of a site of maximum process emission to the uppermost cutting front vertex in the one or more images.

In WO 2012/037955 A1, a method and device have been disclosed for monitoring or verifying (laser) machining of a workpiece, wherein a first radiation component of heat radiation having a first polarization and a second radiation component of heat radiation having a second polarization different from the first polarization are recorded, which are emitted by at least one surface element in a machining region of the workpiece. From the acquired first and second radiation components, data of a surface structure of the workpiece on the at least one surface element is detected. In a variant of the laser machining, a relative movement between the workpiece and the laser beam occurs in a first movement direction, wherein the first polarization is parallel to and the second polarization is perpendicular to the first movement direction.

In the article "Numerical investigations on high-power laser cutting of metals," E. H. Amara et al., Appl. Phys. A (2015) 119:1245-1260, a theoretical approach based on a numerical simulation for studying metal cutting by laser is described, which is based on a three-dimensional model of the cutting front as well as of the kerf. The results based on numerical simulation are compared with experimental observations for six different feed rates.

SUMMARY

Implementations of the present disclosure include a device and a method for monitoring, in particular for closed-loop control, of a thermal cutting process carried out on a typically plate-like workpiece, in particular on a metal sheet. The device includes a focusing unit for focusing a machining beam, in particular a laser beam, onto the workpiece for the formation of a kerf on the workpiece, and an image acquisition unit for the generation of at least one image of a region of the workpiece to be monitored, typically containing a section of the kerf and thus of the cut flanks of the kerf. The invention also relates to an associated method for monitoring, in particular for closed-loop control, of a cutting process carried out on a workpiece. The method includes generating at least one image of a region of the workpiece to be monitored, which contains the cut flanks, more precisely a section of the cut flanks, of a kerf formed on the workpiece during the cutting process.

An underlying object of the invention is to provide a device and a method which enable a reliable detection of at least one measured variable for the cutting quality of the cutting process and in particular a closed-loop control of the cutting process based on the measured variable.

This object is achieved according to the invention by a device of the type mentioned above, which comprises an evaluation unit which is designed to determine, on the basis of the at least one image, at least one measured variable for the course of the gap width of the kerf in thickness direction of the workpiece, in particular for an angle between the two cut flanks of the kerf. Generally, the image of the region of the workpiece to be monitored, which is typically recorded from the upper side of the workpiece, is a thermal image. For the generation of the image, the image acquisition unit comprises a detector, typically in the form of an image sensor in the form of a camera, for example, a CMOS or optionally a CCD camera. The region to be monitored can contain the cutting front of the kerf which is formed during the interaction of the machining beam with the workpiece, but it is also possible that the region to be monitored comprises only the cut flanks behind the cutting front. However, the region to be monitored should not be too far removed from the cutting front of the kerf or from the region of interaction between the machining beam and the workpiece, in particular if a closed-loop control of the cutting process based on the at least one measured variable is to take place.

The inventors have recognized that there is a physical relationship between the geometric form of the course of the gap width of the kerf in thickness direction of the workpiece from the upper side of the typically plate-like workpiece to the lower side of the workpiece, and the cutting quality: For the case in which the energy input in accordance with the distance covered (energy input per unit of length) along the feed direction introduced into the workpiece decreases or another parameter of the cutting process changes unfavorably, the width of the kerf decreases from the upper side of the workpiece in the direction of the lower side of the workpiece, until, in the extreme case, the kerf close to the lower side of the workpiece is completely closed and a complete loss of cut occurs.

The decrease of the gap width of the kerf from the upper side to the lower side of the workpiece (i.e., the formation of a kerf having a V-shaped cross section) can greatly influence the cut quality (roughness, score mark pattern, burr formation and shape accuracy) already clearly before the loss of cut. By a closed-loop control of the thermal cutting process, for the generation of a kerf with substantially constant width in thickness direction, irregularities in the cutting process can be prevented, and, in this way, a quality cut can be guaranteed. For this purpose, it is proposed to determine at least one measured variable which can express the course of the kerf in thickness direction, in particular a decrease of the gap width of the kerf in thickness direction. Such a measured variable is represented by the angle enclosed by the two cut flanks of the kerf, which increases as the gap width of the kerf in thickness direction of the workpiece decreases toward the lower side of the workpiece. The angle between the two cut flanks, which represents a measure for the V-shape of the kerf, for example, in the case of cut flanks with concave or convex curvature, is defined by the angle between the respective cut flanks on the upper side of the workpiece and on the lower side of the workpiece. The measured variable which describes the course of the kerf in thickness direction can be the angle between the two cut flanks; however, the course of the gap width of the kerf can be determined indirectly by another measured variable, as described in greater detail below.

In an embodiment, the image acquisition unit comprises a polarizer which transmits a first linear polarization component of an observation beam for the observation of the region to be monitored to a detector and which filters a second polarization component of the observation beam which is perpendicular to the first polarization component, wherein the evaluation unit is designed to detect the measured variable based on two light stripes extending along the cut flanks of the kerf in at least one image, and wherein, as measured variable, preferably a distance and/or an angle between the two light stripes is detected.

The inventors have recognized that, for the observation of the light stripes, on the basis of which the course of the gap width in thickness direction of the kerf can be determined, it is typically necessary to use a single linear polarization component of the observation beam for the observation of the region to be monitored. The inventors moreover have recognized that the two light stripes which can be recognized in the image generated in this manner and which extend along the cutting front and along the cut edges of the kerf correspond to a portion of the process emissions, wherein the cutting front or the cut edges are oriented within an angular range with respect to the observation direction in which the polarization-dependent emissions are particularly strong. In the region in which the two light stripes can be recognized, the cutting front angle or the angle between the two cut edges of the kerf lies in a particularly strongly emitting angular range. When approaching the separation limit at which the workpiece in the thermal cutting process is just barely cut through over its entire thickness, but also when approaching the quality cut limit at which a quality cut is just barely present but the width of the kerf in thickness direction already decreases, the distance between the light stripes also decreases. The angle between the two light stripes in the image can also be used as measured variable for the cut quality, since the angle between the light stripes, which typically extend parallel in the case of a quality cut, changes in the case of a cut with poor cut quality or shortly before a loss of cut, wherein two light stripes merge.

If the angle or the distance between the cut edges decreases, this indicates a worsening of the melt expulsion in the lower region of the cut flanks, which leads to increased roughness of the cut flanks. Therefore, the distance between the light stripes or the angle between the light stripes represents an (analogous) measured variable for the process state, more precisely the cut quality (quality cut, separating cut, feed reserve, . . . ) during a thermal cutting process, in particular in a fusion cutting process, wherein this measured value is in particular substantially proportional to the distance of the cutting process from the separating cut limit or quality cut limit. For this reason, the distance between the light stripes and/or the angle between the light stripes can be used as input variable(s) for the closed-loop control of parameters of the cutting process (energy input per unit of length, focus position, etc.). As described earlier, it is not absolutely necessary to use the light stripes for the determination of the measured variable for the course of the gap width of the kerf. For example, the angle between the two cut flanks (see above) can be used as (continuous) measured variable for the cut quality of the cutting process. It is understood that, based on the measured variable(s), just a state control or quality control of the cutting process can take place, without a closed-loop control of the cutting taking place.

It is possible that in some process configurations of the cutting process a continuous molten mass runs around the entire cutting front. It can also happen that the melt threads each run off along a cut flank and in the center on the cutting front. However, such process states do not influence the underlying measurement principle described here, i.e., during the observation with a linear polarization component (s polarization), only two light stripes are always detected. Instead, based on an observation of the light stripes, it is possible to deduce the course of the gap width of the kerf, in particular the angle between the cut flanks in thickness direction of the workpiece, so that it is possible to distinguish between a "quality cut" with low roughness of the cut flanks and a "separating cut" with greater roughness (and any intermediate steps thereof). As described earlier, a decrease of the width of the kerf from the upper side to the lower side of the workpiece indicates an imminent defective cut. Thus, based on the measured variable, a "robustness" of the process (i.e., for example, a feed reserve or a power reserve of the (laser) radiation source) can be determined.

In a development, the evaluation unit is designed to determine the distance between the light stripes based on the positions of two intensity maxima of the image transversely to a feed direction of the thermal cutting process. The intensity profile or the intensity distribution of the detected observation radiation is here typically acquired or evaluated in an image section of the image transversely to the feed direction, which can extend, for example, along an image row or pixel row of the image or of the camera. In particular in the case in which the observation direction is moved along with the feed direction, the image row or the pixel row which is evaluated can be defined in a set manner in the image or on the chip of the camera; however, the position of the evaluated image region can also be changed relative to the machining beam or the feed direction. Instead of the evaluation of a single image row or pixel row, optionally several image rows can also be used for the evaluation or for the determination of the intensity profile, averaged in a suitable manner, for example, by using the arithmetic average or the median of the intensity values of the individual image rows. In the optionally averaged intensity profile, the distance between the two intensity maxima is detected and can be used as measured variable for the cutting quality of the cutting process, as described earlier. For the computation of the positions of the intensity maxima from the intensity profile, image processing methods can be used.

In an alternative or additional image evaluation, the angle between the two light stripes in a top view onto the workpiece or the angle between the two cut flanks (in cross-section direction) is detected, and the angle or the angular difference is used as measured variable. For the angle measurement, image evaluation algorithms can also be used, which are described in the literature, for example, the Hough transform.

As described earlier, the angle between the cut flanks or the decrease of the width of the kerf in negative Z direction or in thickness direction of the workpiece can be used as measured variable. The angle between the cut flanks can be detected directly or optionally based on the determination of the gap width of the kerf on the upper side of the workpiece and of the gap width on the lower side of the workpiece (to the extent that the thickness of the workpiece is known). For the determination of the geometry of the kerf in thickness direction, it is possible to use, for example, optical coherence tomography (OCT) or an OCT sensor, i.e., an interferometric method, wherein by an oscillating movement from the upper side of the workpiece, the depth profile of the kerf behind the machining beam is measured, and, in the process, for example, the angle between the cut flanks of the kerf, the gap width of the kerf on the lower side of the workpiece and the gap width of the kerf on the upper side of the workpiece are measured. A structured illumination of the workpiece or a quotient goniometer can also be used for this purpose. Optionally, already based on the determination of the gap width on the lower side of the workpiece, the conclusion can be drawn that the cut quality is poor if the gap width on the lower side of the workpiece is (clearly) smaller than the focus diameter.

In another image evaluation, images of quality cuts and separating cuts are clustered, and the current image of the region of the cutting process to be monitored is associated via comparative image evaluation with these clusters. For this purpose as well, known image evaluation algorithms can be used, for example, the Haar algorithm. In this case, again on the basis of the light stripes in the clustered images of separating cuts and quality cuts, a measured variable for the cut quality can be detected, which can optionally be used for the closed-loop control, to the extent that it is a (quasi) continuous measured variable.

In all the image evaluation algorithms, it can be necessary or advantageous to rotate the recorded images beforehand with regard to the current feed direction and to optionally enhance them via black and white image balancing, distortion correction and other mechanisms known in image processing. In addition, it can be advantageous to average several temporally successive images pixel-wise by means of the median, average or comparable filters. Moreover, it is advantageous to ignore images with process disturbances (abrupt increases in image brightness due to spontaneous evaporation or plasma formation) during the evaluation of the images. However, such process disturbances can be used as an additional indicator of a low feed reserve or as an indicator that the process is close to a cutting tear.

In an embodiment, the image acquisition unit is designed for the formation of an observation beam for the observation of the region to be monitored from an observation direction extending at an angle with respect to the beam axis of the machining beam, wherein the observation beam preferably runs through the focusing unit, and wherein the image acquisition unit comprises an imaging optic system for the generation of the image of the region to be monitored from the observation direction extending at the angle with respect to the beam axis of the machining beam. In order to enable such a non-coaxial observation, the device or the image acquisition unit can be designed, for example, as described in WO 2015/036140 A1 cited at the beginning, which is incorporated into this application by reference in its entirety. A non-coaxial observation of the light stripes has been found to be advantageous, but not absolutely necessary, i.e., in principle an observation of the region to be monitored coaxially or parallel to the beam axis of the machining beam is also possible.

In a development, the angle of the observation direction with respect to the beam axis of the machining beam is between 1° and 5° and preferably between approximately 1.5° and 4.5°. An observation under relatively small angles with respect to the beam axis of the observation beam has been found to be advantageous for the present application.

In another development, the image acquisition, unit is designed to vary the orientation of the observation direction of the observation beam and/or the direction of the first, transmitted linear polarization component of the observation beam in a plane perpendicular to the beam axis of the machining beam as a function of a feed direction of the thermal cutting process, in particular to keep it constant relative to the feed direction. As described in WO 2015/036140 A1 cited at the beginning, it can be advantageous if the angle between the feed direction and the observation direction in the plane perpendicular to the beam axis has a constant value, even when the feed direction, i.e., the direction of the relative movement between the machining beam and the workpiece, varies. For example, it can be advantageous for the imaging acquisition if the observation direction, in the projection of the workpiece plane, extends counter to the feed direction, which is also referred to as dragging observation, or optionally in the feed direction, which is also referred to as stabbing observation.

In many application cases, it has also been found to be advantageous to keep the orientation of the polarization component which is filtered out by the polarization filter constant relative to the feed direction. In particular, the filtered polarization component can be oriented parallel to the feed direction or perpendicular to the feed direction, in order to improve or simplify the observation. In order to change the direction of the linear polarization component together with the feed direction or rotate it, it is possible, for example, to use a motor driven (typically rotatable) polarization filter or an electrically rotatable polarization filter (LCD polarizer). If, for changing the orientation of the observation direction of the observation beam, a rotatable aperture is used, which typically comprises at least one eccentric aperture opening, the polarization filter can then be mounted on the rotatable aperture and rotated together with said aperture, without the need for a separate drive for the rotation of the polarization filter.

In another embodiment, the observation direction extends, in a projection in a plane perpendicular to the beam axis of the machining beam, in the feed direction, i.e., the feed direction and the observation direction are parallel and have the same orientation in this plane. This so-called stabbing observation has been found to be particularly advantageous for the detection of the light stripes.

In another development, the direction of the first, transmitted linear polarization component of the observation beam, in a plane perpendicular to the beam axis of the machining beam (i.e., in the workpiece plane), extends at an angle between 55° and 125°, preferably between 80° and 100°, and particularly preferably at an angle of 90° with respect to the feed direction. As described earlier, the light stripes can typically be observed only in the case in which the observation beam has a linear polarization component. This polarization component extends in an ideal manner perpendicularly to the feed direction (s polarization).

In a development, the image acquisition unit is designed for generating the at least one image of a region of the workpiece to be monitored, at wavelengths between 700 nm and 2 µm. For iron-based workpiece materials, it has been found to be advantageous to use observation wavelengths for the observation of the region to be monitored between 700 nm and 1,000 nm, preferably between 800 nm and 940 nm. These wavelengths can be acquired with SiO-based image sensors or detectors. An observation at higher wavelengths (for example, up to 1.6 µm) is also possible but requires InGaAs-based image sensors or detectors which are considerably more expensive and have a lower frame rate. An advantage of observation at higher wavelengths consists in that the light stripes can be observed even in workpieces made of materials having a lower melting temperature (for example, Al, Cu). Shorter wavelength of less than 700 nm generally no longer provide a sufficiently intense thermal radiation to ensure a reliable evaluation.

For the evaluation of the images typically recorded or generated by a camera, more precisely the image data, the evaluation unit comprises a conventional image processing unit which can be designed, for example, in the form of a computation unit or a microprocessor. In addition, the evaluation unit is in connection via an interface for the data exchange with an open-loop or a closed-loop control unit for the open-loop or closed-loop control of the machining process.

In another embodiment, the device additionally comprises an open-loop and/or closed-loop control unit for influencing at least one control variable of the thermal cutting process as a function of the at least one measured variable detected for the course of the gap width in thickness direction of the workpiece. In this case, the measured variable or the measured value determined, for example, based on the light stripes is used in order to ensure, by influencing, adaptation or closed-loop control of control variables of the thermal cutting process (for example, feed rate, laser power, focus position, gas pressure, etc.), a constant cut quality (in particular edge roughness) and thus a reliable separating cut.

Moreover, the detected measured value or measured variable can be recorded and monitored for the verification of the process state. In the case of unacceptable deviations, an operator can be informed and/or process-improving measures (adjustment, cleaning) can be initiated automatically or manually. Based on the measured variables, the conclusion can also be drawn that maintenance of the device is upcoming.

The device can also comprise additional components, for example, an illumination source which is used for illuminating the workpiece in the region to be monitored. The image acquisition unit can be designed in particular for recording or for generating an image through a nozzle opening of a laser machining nozzle for directing the laser beam onto the workpiece. The device can be, for example, a laser cutting head or laser cutting machine.

Another aspect of the invention relates to a method of the type mentioned at the beginning, further comprising: Detection of at least one measured variable for the course of the gap width of the kerf in thickness direction of the workpiece, in particular for an angle between the two cut flanks of the kerf, based on the at least one image. As described earlier, the measured variable detected in this manner can be recorded and monitored, for example, for the verification of the process state and, in the case of unacceptable deviation, an operator can be optionally notified.

As described earlier, the angle between the cut flanks or the decrease in the width of the kerf in negative Z direction or in thickness direction of the workpiece can be used as measured variable, wherein the angle between the cut flanks can be detected directly or, for example, by the determination of the gap width of the kerf on the upper side of the workpiece as well as the gap width on the lower side of the workpiece (to the extent that the thickness of the workpiece is known). For the determination of the geometry of the kerf in thickness direction, as described earlier, it is possible to use optical coherence tomography (OCT), a structured illumination of the workpiece or a quotient goniometer. When appropriate, the gap width on the lower side of the workpiece can be sufficient as measured variable for the cutting quality, for example, when it is compared with the focus diameter of the machining beam. For the case in which the gap width on the lower side of the workpiece is smaller than the focus diameter of the observation beam, this indicates a poor cut quality.

In a variant, a first linear polarization component of an observation beam for the observation of the region to be monitored is transmitted for the generation of the at least one image to a detector, and a second polarization component of the observation beam, which is perpendicular to the first polarization component, is filtered, wherein the measured variable is detected based on two light stripes extending along the cut flanks of the kerf in the at least one image, wherein the measured variable preferably is a distance or an angle between the two light stripes. As described earlier, based on the light stripes, a conclusion can be drawn regarding the course of the gap width of the kerf in thickness direction of the workpiece.

In another variant, the orientation of an observation direction of an observation beam for the observation of the region to be monitored and/or the direction of the first, transmitted linear polarization component of the observation beam in a plane perpendicular to the beam axis of the machining beam is/are varied as a function of a feed direction of the thermal cutting process, in particular is/are kept constant relative to the feed direction.

In a variant, the observation direction, in a projection into a plane perpendicular to the beam axis of the machining beam, oriented in feed direction, i.e., a stabbing observation occurs, which has been found to be advantageous in particular for the observation of the light stripes.

Preferably, the direction of the first transmitted linear polarization component of the observation beam in a plane perpendicular to the beam axis of the machining beam extends at an angle between 55° and 125°, preferably between 80° and 100°, and particularly preferably at an angle of 90° with respect to the feed direction. The filtered linear polarization component in this case is a polarization component which is oriented perpendicularly with respect to a plane containing the feed direction as well as the beam axis of the machining beam (s polarization). As described earlier, the filtering of a linear polarization component can be necessary for the imaging acquisition of the light stripes.

In an advantageous variant, the method in addition comprises: Influencing of at least one control variable of the thermal cutting process as a function of the detected measured variable. By the adaptation or the closed-loop control of one or more control variables of the laser cutting process, a constant quality during the laser cutting can be ensured.

DESCRIPTION OF DRAWINGS

Additional advantages of the invention result from the description and the drawing. Also, the above-mentioned features and the features yet to be explained in further detail can be used each individually or together in any combinations. The embodiments shown and described are not to be considered a final listing; instead, they are exemplary in nature for the description of the invention.

The figures show.

DETAILED DESCRIPTION

Figure 1A:
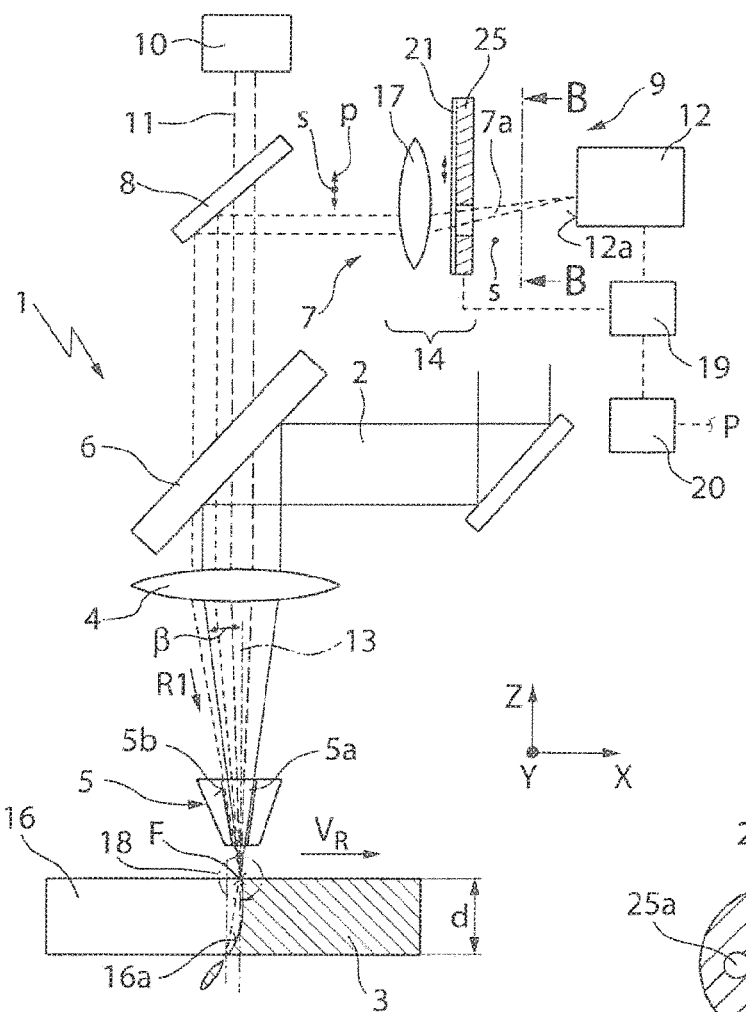
FIG. 1A a diagrammatic representation of an embodiment of a device for the monitoring and the closed-loop control of a laser cutting process on a workpiece, FIG. 1B a representation of an aperture for the formation of an observation beam in such a device along a section line B-B of FIG. 1A, FIG. 2A-2C a three-dimensional representation of a kerf, a top view onto a kerf, and a thermal image of a region of the workpiece to be monitored, with two light stripes in the case of a quality cut, FIG. 3A-3C representations analogous to FIG. 2A-2C in the case of a separating cut with low cut quality, and FIG. 4 a representation of an intensity profile transverse to the feed direction along an image row of the thermal image of FIG. 2C.

In the following description of the drawings, identical reference numerals are used for identical or functionally equivalent components.

FIG. 1A shows an exemplary design of a device 1 for the monitoring and closed-loop control of a laser cutting process carried out on a workpiece 3 by means of a machining beam in the form of a laser beam 2. In the example shown, the device 1 is designed in the form of a laser machining head which is part of a laser machining machine, not represented in further detail. In the example shown, the laser beam 2 is generated by a CO2 laser. Alternatively, the laser beam 2 can be generated, for example, by a solid state laser. The laser beam 2 is focused for carrying out a cutting machining on the workpiece 3 by means of a focusing unit in the form of a focusing lens 4 onto the workpiece 3. In the example shown, the focusing lens 4 is a lens made of zinc selenide which focuses the laser beam 2 through a laser machining nozzle 5, more precisely through its nozzle opening 5a, onto the workpiece 3, and namely in the example shown onto a focus position F on the upper side of the workpiece 3. There, the laser beam 2 forms an interaction region 18 with the workpiece 3, behind which, opposite a feed direction v or cut direction of the laser cutting process, a kerf 16 is produced. In the case of a laser beam 2 from a solid state laser, a focusing lens made of quartz glass, for example, can be used.

In FIG. 1A, one can also see a deflection mirror 6, designed to be partially transparent, which reflects the incident laser beam 2 (for example at a wavelength of approximately 10.6 μm) and transmits observation radiation relevant to a process monitoring to an additional partially transparent deflection mirror 8. In the example shown, the deflection mirror 6 is designed to be partially transparent for observation radiation in the form of thermal radiation at wavelengths λ of approximately 700 nm to 2,000 nm. The additional partially transparent deflection mirror 8 reflects the observation radiation toward an image acquisition unit 9. An illumination source 10 is used for the coaxial illumination of the workpiece 3 with illumination radiation 11. The illumination radiation 11 is transmitted by the additional partially transmissive deflection mirror 8 as well as by the deflection mirror 6 and deflected through the nozzle opening 5a of the laser machining nozzle 5 onto the workpiece 3.

Alternatively to the partially transparent deflection mirrors 6, 8, scraper mirrors or apertured mirrors which reflect incident radiation only from a marginal region can be used for supplying the observation radiation 7 to the image acquisition unit 9 or the illumination radiation 11 to the workpiece 3. In addition, at least one mirror introduced laterally into the beam path of the laser beam 2 can be used in order to enable the observation.

As illumination source 10, diode lasers or LEDs or flash lamps can be provided, which, as shown in FIG. 1A, can be arranged coaxially but also off-axis with respect to the laser beam axis 13. The illumination source 10 can also be arranged, for example, outside (in particular next to) the device 1 and oriented onto the workpiece 3; alternatively, the illumination source 10 can be arranged within the device 1, but not oriented coaxially with respect to the laser beam 2 onto the workpiece 3. Optionally, the device 1 can also be operated without an illumination source 10.

Part of the image acquisition unit 9 is a geometrically high-resolution camera 12 arranged in the observation beam path 7 behind the additional partially transparent deflection mirror 8. The camera 12 can be a high-speed camera which is arranged coaxially with respect to the laser beam axis 13 or to the extension of the laser beam axis 13 and thus direction-independently. In the example shown, the recording of images by the camera 12 takes place in the reflected-light method in the NIR/IR wavelength range, in order to record process inherent luminescence or a thermal image of the cutting process. In the example shown in FIG. 1A, a filter can be arranged before the camera 12, if additional radiation and wavelength portions are to be excluded before the acquisition with the camera 12. The filter can be designed, for example, as a narrow-band band-pass filter with a full width at half maximum of, for example, approximately 15 nm, which transmits wavelengths λ in the range around approximately 800 nm.

Figures 2A, 3A:
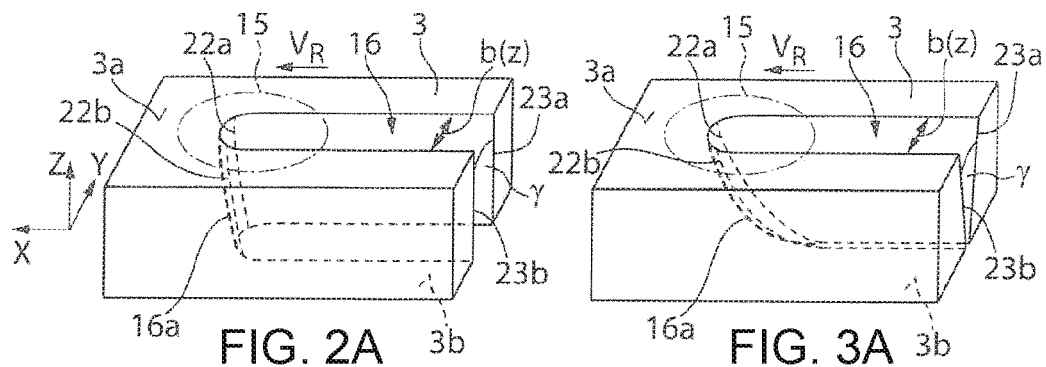
Figures 2B, 3B:
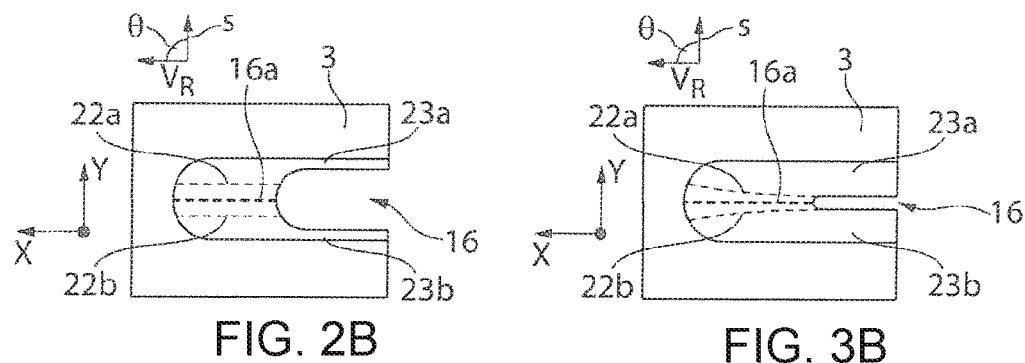

For the generation of images B1, B2 of a region 15 of the workpiece 3 to be monitored, which is shown in FIGS. 2A and 2B or in FIGS. 3A and 3B and which contains the kerf 16 or a section of the kerf 16 with the cutting front 16a, on a detector surface 12a of the camera 12, the image acquisition unit 9 comprises an imaging optic system 14. In the example shown, the imaging optic system 14 has an aperture 25 which is mounted so that it can be rotated around a central rotation axis D, so that, during the rotation, the position of an eccentrically arranged aperture opening 25a moves on a circular arc around the rotation axis D.

Due to the arrangement of the aperture 25 in the beam path of the imaging optic system 14 focused by means of the lens 17, only a portion of the observation beam path 7, which passes through a marginal region of the focusing lens 4 and is oriented in the convergent beam path after the focusing lens 4 at an angle β with respect to the beam axis 13 of the laser beam 2, passes through the aperture opening 25a arranged eccentrically with respect to the extension of the beam axis 13 of the laser beam 2 and forms an observation beam 7a which is reproduced on the detector surface 12a. In the example shown in FIG. 1A, an observation direction R1 of the observation beam 7a, in the projection into the XY plane or into the workpiece plane, extends in feed direction vR, along which the laser beam 2 and the workpiece 3 are moved relative to one another in the XY plane, in order to form the desired cut contour, i.e., a stabbing observation occurs. The angle β, at which the observation direction R1 with respect to the beam axis 13 of the laser beam 2 is oriented, is between approximately 1° and approximately 5°, for example, at approximately 4° in the depicted example.

As can be seen in FIG. 1A, on the aperture 25, a polarization filter 21 is applied, which rotates together with the aperture 25 around the rotation axis D. The polarization filter 21 is designed for filtering a linear polarization component p, which in the example shown, is oriented parallel to a plane (XZ plane) which contains the feed direction v as well as the Z direction or the beam axis 13 of the laser beam 2. As can be seen in FIG. 1A, after the polarization filter 21, the observation beam 7a has only a polarization component s oriented perpendicularly with respect to the XZ plane. The filtering of a linear polarization component of the observation beam 7a has been found to be advantageous for the observation of the kerf 16 or of the region 15 to be monitored. It is understood that, instead of the polarization component p oriented parallel to the XZ plane, optionally the polarization component s oriented perpendicularly to the XZ plane or a differently oriented polarization component can be filtered with the aid of the polarization filter 21. The use of the s polarized polarization component has been found to be particularly advantageous for the observation of the kerf 16, since the lines represented as broken lines in FIGS. 2A and 2B and in FIGS. 3A and 3B, which substantially correspond to the light stripes 22a, b shown in FIG. 2C and in FIG. 3C, have an optimal angle for emitting a large amount of s polarized radiation.

Figure 1B:
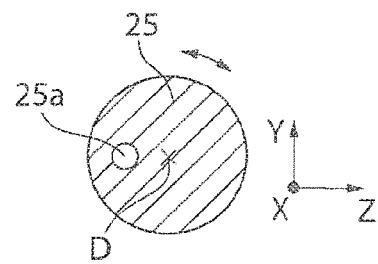

Instead of a mechanically adjustable aperture 25, an electrically adjustable aperture, for example, in the form of an LCD array, can also be used, wherein individual pixels or pixel groups are switched on or off electronically in order to generate the aperture effect. The mechanical aperture 25 can also be moved or shifted in a way other than that shown in FIG. 1A and FIG. 1B, transversely to the observation beam path 7, for example, in the YZ plane, in order to obscure different portions of the observation beam path 7 or in order to open them for the observation. The aperture 25 can also be implemented in the form of one or more mechanical elements which can be flipped open and closed. Accordingly, the polarization filter 21 can also be designed as an LCD polarizer in order to select the orientation of the filtered polarization components in an appropriate manner, in particular in order to rotate the orientation of the filtered polarization components.

Figures 2C, 3C:
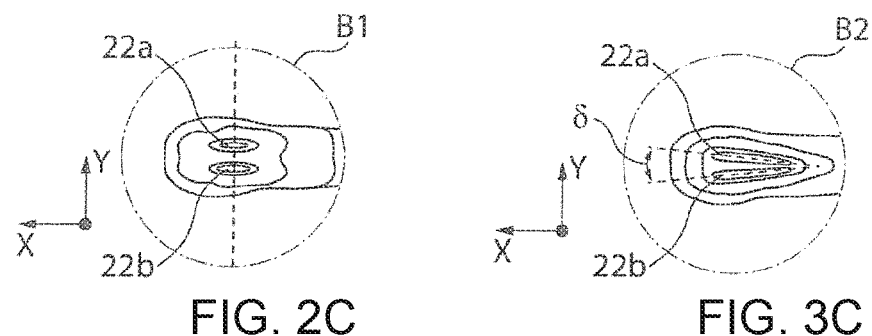

As can be seen in FIG. 2C and in FIG. 3C, an image of the region 15 of the workpiece 3 to be monitored, which is captured in each case by the imaging optic system 14, is delimited by a circular inner contour 5b of the laser cutting nozzle 5. The region 15 to be monitored, which is delimited by the inner contour 5b of the laser cutting nozzle 5, contains an image B1, B2 of the interaction region 18, which, in the representations shown in FIG. 2C and FIG. 3C, was recorded from the same observation direction R1. The projection of the observation direction R1 in the XY plane is represented in FIG. 2A by an arrow. As described earlier, the observation direction R1, in the example shown in FIG. 1A, extends along the feed direction vR, i.e., in positive X direction, which is referred to as stabbing observation in relation to a cutting front 16a on the workpiece 3, behind which the kerf 16 is formed.

In the two recorded images B1, B2, in each case two light stripes 22a, b can be seen, which extend substantially along the X direction or the feed direction vR, along which the cut flanks 23a, b of the kerf 16 also extend, which are represented in FIG. 2A and in FIG. 3A on a subregion or section of the workpiece 3, on whose upper side 3a the circular contour of the region 15 to be monitored can also be seen. Each of the two images B1, B2 was recorded with a different feed speed vR, wherein the feed speed vR is lower in the image B1 shown in FIG. 2C and higher in the image B2 shown in FIG. 3C. The distance A (compare FIG. 4) between the light stripes 22a, b in Y direction, i.e., transverse with respect to the feed direction vR, decreases with increasing feed speed vR, until in the image B2 shown in FIG. 3C the two light stripes 22a, b partially overlap or merge to form a common light stripe. The two merging light stripes 22a, b enclose an angle δ with one another.

It has been shown that, in a cutting process during which the image B1 shown in FIG. 2C is recorded, the cut flanks 23a, b of the kerf 16 extend substantially parallel to one another in thickness direction of the workpiece 3 (i.e., in Z direction), i.e., at a very small angle γ, so that a quality cut is present (compare FIGS. 2A and 2B). In image B2 shown in FIG. 3C, wherein the two light stripes 22a, 22b merge partially, on the other hand, a separating cut of lower quality is present, wherein burr formation and score mark formation along the cut flanks 23a, b begin, which in this case do not extend substantially parallel, but rather extend in thickness direction (Z direction) at a clearly greater angle γ, as represented in FIG. 3A. In the kerf 16 shown in FIGS. 3A and 3B, the width b(z) of the kerf 16 continuously decreases in Z direction from the upper side 3a to the lower side 3b of the workpiece 3, so that, in the cut representation shown in FIG. 3B, the kerf 16 has a clearly marked V-shaped profile. The kerf 16 shown in FIGS. 3A and 3B, which tapers considerably downward in cross section, is rather disadvantageous for the fusion cutting process, i.e., the kerf 16 should have the geometry shown in FIGS. 2A and 2B with the substantially parallel cut flanks 23a, b, i.e., with a gap width b(z) which is substantially constant over the thickness d of the workpiece 3.

In order to submit the cutting process to closed-loop control in such a way that a quality cut is always present, one can use the light stripes 22a, b shown in FIG. 2C and FIG. 3C in the thermal image, representing substantially a top view onto the lines shown in FIGS. 2A and 2B and in FIGS. 3A and 3B, along which the polarization-dependent process emissions are particularly strong in the detection of s polarized radiation. In the kerf 16 shown in FIGS. 2A and 2B, the two lines along which strong process emissions occur and which correspond to the light stripes 22a, b, extend substantially parallel to one another, so that a distance A (compare FIG. 4) between the two light stripes 22a, b can be determined. In the example shown in FIGS. 3A and 3B, the lines with strong polarization-dependent process emissions corresponding to the light stripes 22a, b extend along the slanted cut flanks 23a, b of the kerf 16, so that the distance A between the observed light stripes 22a, b decreases in negative X direction. In the lower quality separating cut shown in FIG. 3A-3C, the two light stripes 22a, b converge behind the cutting front 16a, so that the two light stripes 22a, b overlap and, in the top view onto the upper side 3a of the workpiece 3, assume a V-shaped orientation with respect to one another, as can be seen in FIG. 3C.

As measured variable(s) for the cutting quality of the cutting process, the distance A between the two light stripes 22a, b in Y direction, i.e., transverse to the feed direction v, and the angle δ between the two light stripes 22a, b can be used.

Figure 4:
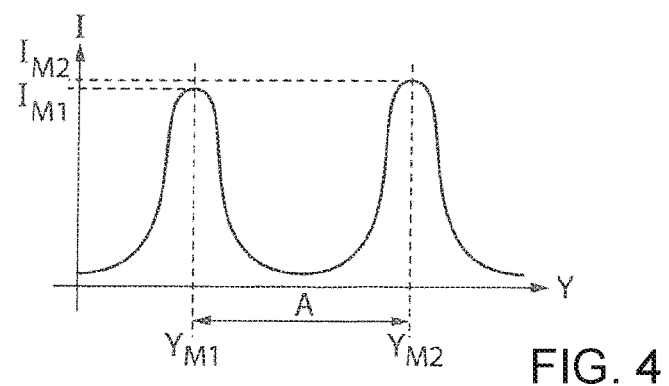

The distance A between the two light stripes 22a, b can be detected, for example, in the image B1 shown in FIG. 2C, in the manner described below in connection with FIG. 4, for the purpose of which an evaluation unit 19 of the device 1, shown in FIG. 1A, is used. As indicated in FIG. 2C, along an image row or pixel row extending in Y direction, the radiation intensity I incident on the detector surface 12a is measured, which is attributed substantially to the thermal radiation of the workpiece 3. As can be seen in FIG. 4, the radiation intensity I has two intensity maxima IM1, IM2, with which in each case a position YM1, YM2 in Y direction is associated. The difference YM2−YM1 between the two positions YM1, YM2 corresponds to the distance A between the two light stripes 22a, b. Instead of the evaluation of the radiation intensity I along an image row extending in Y direction, the intensity values of several image rows can also be used, if they are averaged in an appropriate manner (for example, average or median). Suitable methods from image processing can be used for the identification of the two intensity maxima IM1, IM2.

In image B2 shown in FIG. 3C, an image evaluation can occur, in that the angle δ between the two merging light stripes 22a, b is detected and the angle δ is used as measured variable for the cutting quality. For this purpose, in a manner similar to that represented in FIG. 4, based on the radiation intensity I in the recorded image B2, first the substantially oval or ellipsoid outer contours of the two light stripes 22a, b can be determined, for example, by observation of the contour or geometry which corresponds to a predetermined intensity value of the measured radiation intensity I in the recorded image B2. If the outer contours of the two light stripes 22a, b are known, their longitudinal axes can be determined. The angle δ is then measured between the two longitudinal axes of the light stripes 22a, b. For the angle measurement, alternatively or additionally, evaluation algorithms can be used, as described in the literature (for example, Hough transform).

In image B1 shown in FIG. 2C, the determination of the angle δ between the light stripes 22a, b can be problematic, since they extend nearly parallel, while in image B2 shown in FIG. 3C, the determination of the distance A between the two converging light stripes 22a, b can be problematic. It is understood that, in the case of a cutting speed between the two extremes shown in FIG. 2A-2C and FIG. 3A-3C, in the manner shown in FIG. 4, based on the two intensity maxima IM1, IM2, on the one hand, the distance A between the two light stripes 22a, b and, on the other hand, the angle δ between the two light stripes 22a, b can be detected, in order to be able to evaluate the cut quality based on the two measured variables A, δ.

Alternatively, in the evaluation unit 19, an image evaluation can occur, wherein images of quality cuts and separating cuts (i.e., cuts with lower cut quality), wherein in each case the light stripes 22a, b can be seen, are clustered, and the currently generated or recorded image can be associated with these clusters via comparative image evaluation. For this purpose as well, algorithms known from image processing can be used, for example, the Haar algorithm. The association with a cluster also represents a measured variable—albeit not an analogue or continuously changeable measured variable—for the cutting quality of the cutting process.

As a function of the at least one measured variable A, δ detected as described earlier, a closed-loop control unit 20 shown in FIG. 1A can influence or vary at least one control variable, for example, the feed speed, the power P of the laser not illustrated in FIG. 1A, the focus position F, the gas pressure of an auxiliary gas used in the cutting process, etc., and namely in such a manner that the measured variable A, δ has a predetermined value or stays within a predetermined interval of values. By means of such a closed-loop control, it can be ensured that, in the (fusion) cutting process, a constantly high cut quality is achieved, so that defective cuts and in particular losses of cut can be completely avoided in an ideal manner.

In particular, the feed speed or the laser power P can be set in such a manner that it is always just barely below the maximum acceptable feed speed or laser power at which a quality cut is still possible, i.e., the feed reserve or the power reserve can be used up nearly completely. For the adaptation or the influencing of the feed speed, the closed-loop control unit 20 can act on movement devices, not shown in further detail, for the moving of the workpiece 3 and/or of the laser cutting head 1.

In order to be able to observe the cut quality, for example, the distance A or the angle δ, in a case of a change of the feed direction vR during the cutting along curved cut contours, from a desired observation direction, in particular the observation direction R1 in feed direction vR, it can be necessary to change the orientation of the observation direction R1 in the XY plane as a function of the feed direction vR or of the orientation of the feed direction vR in the XY plane. For this purpose, the evaluation unit 19 (optionally also the closed-loop control unit 20) can be used, which rotates the aperture 25 and thus the aperture opening 25a along with it accordingly around the rotation axis D in the case of a change of the feed direction vR, so that the observation direction R1 remains always oriented in feed direction vR. By the co-rotation of the aperture 25, the orientation of the linear polarization component (typically s polarization), which is filtered out by the polarization filter 21 also rotating along with it, can be kept constant relative to the feed direction vR. It is understood that, for this purpose or for the generation of an observation beam 7a which is oriented at an angle β with respect to the beam axis 13, an aperture 25 is not absolutely necessary, and that, instead, the image acquisition unit 9 can be designed in a different manner for this purpose, for example, as described in WO 2015/036140 A1.

What is claimed is:
1. A device for control of a thermal cutting process carried out on a workpiece, the device comprising:
   a focusing unit configured to focus a machining beam onto the workpiece for the formation of a kerf on the workpiece, the kerf comprising two cut flanks defining a kerf gap therebetween;

an image acquisition unit configured to generate at least one image of a region of the workpiece to be monitored;

a processor that determines, based on the at least one image, at least one measured variable for a gap width of the kerf gap in a thickness direction of the workpiece from an upper side of the workpiece to a lower side of the workpiece, wherein the measured variable comprises at least one of i) a variance in distance between the two cut flanks, the distance decreasing a long the thickness direction of the workpiece, or ii) an angle between the two cut flanks; and a control unit configured to control the cutting process as a function of the at least one measured variable.

2. The device of claim 1, wherein the image acquisition unit comprises a polarizer that transmits a first linear polarization component of an observation beam for the observation of the region to be monitored to a detector, and wherein the polarizer filters a second polarization component of the observation beam, which is perpendicular to the first polarization component, wherein the processor is configured to detect the measured variable based on two light stripes extending along the cut flanks of the kerf in the at least one image.

3. The device of claim 2, wherein the processor is configured to determine the distance between the light stripes based on positions of two intensity maxima of the image transversely to a feed direction of the thermal cutting process.

4. The device of claim 1, wherein the image acquisition unit is designed to form an observation beam for the observation of the region to be monitored from an observation direction extending at an angle relative to the beam axis of the machining beam, and wherein the image acquisition unit comprises an imaging optic system for the generation of the image of the region to be monitored from the observation direction extending at the angle relative to the beam axis of the machining beam.

5. The device of claim 4, wherein the observation beam runs through the focusing unit.

6. The device of claim 4, wherein the angle of the observation direction relative to the beam axis of the machining beam is between 1° and 5°.

7. The device of claim 4, wherein the image acquisition unit is configured to vary at least one of an orientation of the observation direction of the observation beam and a direction of a first transmitted linear polarization component of the observation beam, the orientation or direction being varied in a plane perpendicular to the beam axis of the machining beam as a function of a feed direction of the thermal cutting process.

8. The device of claim 7, wherein the orientation or direction is varied to keep the orientation or the direction constant relative to the feed direction.

9. The device of claim 8, wherein the observation direction, in a projection in a plane perpendicular to the beam axis of the machining beam, extends in the feed direction.

10. The device of claim 7, wherein the direction of the first transmitted linear polarization component of the observation beam, in a plane perpendicular to the beam axis of the machining beam, extends at an angle between 55° and 125° relative to the feed direction.

11. The device of claim 7, wherein the direction of the first transmitted linear polarization component of the observation beam, in a plane perpendicular to the beam axis of the machining beam, extends at an angle between 80° and 100° relative to the feed direction.

12. The device of claim 1, wherein the image acquisition unit is designed to generate the at least one image of the region of the workpiece to be monitored at wavelengths between 700 nm and 2 μm.

13. The device of claim 1, wherein the control unit comprises at least one of an open-loop control unit and a closed-loop control unit, the control unit configured to influence a control variable of the thermal cutting process as a function of the at least one detected measured variable for the course of the gap width of the kerf in the thickness direction of the workpiece.

14. The device of claim 13, wherein the control variable comprises at least one of a feed rate, a focus position, and a gas pressure of the device.

15. The device of claim 1, wherein the evaluation unit processor is configured to determine, based on the at least one image, at least one measured variable for an angle at which the two cut flanks of the kerf extend with respect to each other in the thickness direction.

16. A method comprising:
obtaining a device for control of a thermal cutting process carried out on a workpiece, the device comprising:
a focusing unit configured to focus a machining beam onto the workpiece for the formation of a kerf on the workpiece, the kerf comprising two cut flanks defining a kerf gap therebetween;
an image acquisition unit configured to generate at least one image of a region of the work piece to be monitored;
a processor that determines, based on the at least one image, at least one measured variable for a gap width of the kerf gap in a thickness direction of the workpiece from a n upper side of the workpiece to a lower side of the workpiece, wherein the measured variable comprises at least one of i) a variance in distance between the two cut flanks, the distance decreasing a long the thickness direction of the workpiece, or ii) an angle between the two cut flanks; and
a control unit configured to control the cutting process as a function of the at least one measured variable;
generating, by the image acquisition unit, at least one image of the region of the workpiece that is to be monitored and that contains the cut flanks of the kerf formed on the work piece during the cutting process;
detecting, by the processors and based on the at least one image, the at least one measured variable for a course of a gap width of the kerf in a thickness direction of the workpiece; and
influencing, by the control unit, the thermal cutting process of the device as a function of the at least one measured variable.

17. The method of claim 16, further comprising:
transmitting, by a polarizer to a detector, a first linear polarization component of an observation beam for the observation of the region to be monitored for the generation of the at least one image; and
filtering, by the polarizer, a second polarization component of the observation beam, which is perpendicular to the first polarization component;
wherein detecting the at least one measured variable comprises detecting, in the at least one image, the at least one measured variable based on two light stripes extending a long the cut flanks of the kerf, and wherein the measured variable comprises at least one of i) a distance between the two light strips or ii) an angle between the two light stripes.

18. The method of claim 16, further comprising:
varying, by the image acquisition unit, at least one of an orientation of an observation direction of an observation beam for the observation of the region to be monitored and the direction of the first transmitted linear polarization component of the observation beam, the orientation or direction varied in a plane perpendicular to the beam axis of the machining beam as a function of a feed direction of the thermal cutting process to keep the orientation or direction constant relative to the feed direction.

19. The method of claim 18, wherein varying the observation direction comprises varying, in a projection into a plane perpendicular to the beam axis of the machining beam, the observation direction in the feed direction.

20. The method of claim 18, wherein varying the direction of the first transmitted linear polarization component comprises varying, in a plane perpendicular to the beam axis of the machining beam, the direction of the first transmitted linear polarization component to extend at an angle between 55° and 125° with respect to the feed direction.

21. The method of claim 18, wherein varying the direction of the first transmitted linear polarization component comprises varying, in a plane perpendicular to the beam axis of the machining beam, the direction of the first transmitted linear polarization component to extend at an angle between 80° and 100° with respect to the feed direction.

* * * * *